United States Patent [19]
Jones

[11] 3,955,688
[45] May 11, 1976

[54] ARTICLE HANDLING APPARATUS

[75] Inventor: John Clifford Jones, King's Lynn, England

[73] Assignee: FMC Corporation (U.K.) Limited, Brentford, England

[22] Filed: Mar. 19, 1974

[21] Appl. No.: 452,692

[52] U.S. Cl. .............................. 214/6 F; 214/1 BT; 214/6 FS; 214/8.5 D; 214/309
[51] Int. Cl.² .......................................... B65G 57/04
[58] Field of Search .............. 214/1 BS, 1 BT, 1 BV, 214/1 BH, 1 B, 1 BB, 1 BC, 1 BD, 309, 301, 300, 6 FS, 8.5 C, 8.5 D; 294/65.5; 198/20 R, 20 T, 31, 32

[56] References Cited
UNITED STATES PATENTS

| | | | |
|---|---|---|---|
| 2,615,746 | 10/1952 | Fischer .............................. | 294/65.5 |
| 2,730,279 | 1/1956 | Enock ............................. | 214/309 X |
| 2,732,956 | 1/1956 | Horner et al. ...................... | 214/1 BT |
| 2,858,009 | 10/1958 | Bainbridge .................... | 214/6 FS X |
| 3,300,065 | 1/1967 | Witmer .............................. | 214/6 FS |
| 3,618,790 | 11/1971 | Carmody ........................... | 214/6 FS |
| 3,653,525 | 4/1972 | Merkner et al. ............. | 214/8.5 D X |

Primary Examiner—Frank E. Werner
Attorney, Agent, or Firm—Larson, Taylor & Hinds

[57] ABSTRACT

The apparatus is primarily intended for use in loading and unloading retort baskets in a cannery where several layers of cans are required to be transported in these baskets according to the factory layout. A system of conveyor belts feeds the cans to or from a position close by the basket loading/unloading station and the cans are transferred by contact with a magnetic pick-up element of the same widthwise dimensions as the basket, which picks up each layer of cans in turn. When the basket is being loaded, a collating barrier is used to form the cans of each layer into approximately the formation required to fit into the basket.

3 Claims, 2 Drawing Figures

ARTICLE HANDLING APPARATUS

BACKGROUND OF THE INVENTION

This invention concerns apparatus for handling a plurality of articles to be loaded and unloaded with respect to a container e.g. in the automatic production of canned goods, such as canned foodstuffs. The present invention is particularly concerned with apparatus for loading and unloading cans into and from containers and particularly, but not exclusively, so-called retort baskets. These baskets act as inserts for the pressure vessels in which cans of foodstuffs are treated by steam for cooking and/or sterilizing purposes.

The operation of loading and unloading retort baskets has not previously been successfully automated and in order to ensure the orderly packing of such baskets it has been necessary to provide an attendant at the appropriate point in the automated sequence. This not only increases the cost of the process but limits the rate at which the process can be performed.

It has already been proposed to provide apparatus for stacking the cans in an orderly fashion as opposed to merely depositing them in a random fashion into the retort baskets. However, the apparatus which has been put forward to perform the packing and unpacking operations has been cumbersome and has not been entirely successful. For example, one such apparatus has utilized special retort baskets with removable bottoms. Each basket has been packed by supporting it with its bottom raised to the top of the basket on an adjustable jack and the top of the basket level with a conveyor arranged to discharge into the basket. The basket has been packed layer by layer, the bottom being lowered in one layer increments as packing proceeds and a plastics sheet been placed on top of each layer as it is completed so as to provide a surface over which the subsequent layer of cans can slide into position. Unloading has been performed by raising the bottom of the baskets layer by layer and pushing each layer of cans, as it is moved out of the basket, onto a conveyor. This apparatus only works successfully as long as the cans being discharged from the conveyor belt into the basket and, on unloading, from the basket on to the conveyor belt, do not tip over. It has, therefore, generally been necessary to provide an attendant to correct the loading/unloading in the event that cans become tipped and also to place the plastics sheets in position.

It has also been proposed that an electro-magnet be used to transfer assembled cans from an assembly station at which they are pre-positioned into the form of the basket concerned, to said basket. The same electro-magnet could, it has been proposed, be utilized to unload baskets by a reversal of this procedure. Such an arrangement has not found favour in canneries because the high moisture content of the environment results in an early failure of the insulation of electro-magnets.

SUMMARY OF THE INVENTION.

The object of the present invention is to provide an apparatus for loading/unloading retort baskets or similar containers which overcomes the above difficulties. The present invention provides an apparatus suitable for handling a plurality of articles incorporating magnetically attractable material to be loaded and unloaded from a container, said apparatus comprising a magnetic pick-up element including a permanent magnet, support means for the pick-up element, a pick-up station for the articles, a loading/unloading station for the container and means for moving said support means between said pick-up station and said loading-/unloading station and between said loading/unloading station and a discharge point as required, detaching means for forcibly removing articles attached magnetically to the pick-up element and means provided at the pick-up station to collate said articles into an arrangement having dimensions suitable for loading into a container.

The apparatus may be utilized to load/unload cans one at a time, the support means for the magnetic pick-up element being controlled by programming means so as to ensure correct placement of each can either in the basket or container concerned or at a discharge station. It is preferable however, for the magnetic pick-up element to be arranged to load/unload cans one complete layer at a time. To this end the magnetic pick-up element is so formed as to correspond with the cross-sectional form of the basket or container concerned and an assembly means is provided for pre-positioning cans being loaded into the said form.

In the preferred embodiment of the invention there is further provided apparatus for handling cans containing foodstuffs and the like comprising a conveyor device, can collating means, the conveyor device being arranged to propel cans supported thereon towards the collating means which thereupon assembles the cans into a shape corresponding to the basket or container concerned; a discharge conveyor at the discharge point adapted to deflect cans delivered to the discharge point and to discharge them from the apparatus; and actuating elements for the support means for said magnet pickup element arranged to move the latter in the horizontal plane and the vertical plane so that, in use of the apparatus, it moves to a pick-up station, picks up cans assembled thereat, transports said cans to a retort basket or like container and lowers them into the latter before releasing them, said elements being capable of operating in the reverse manner, to remove cans from a retort basket or like container and release them onto the conveyor device for delivery towards the discharge conveyor.

GENERAL FEATURES OF OPERATION

The movements of the magnetic pick-up element are preferably controlled by programming means, although proximity switches could alternatively be used, so that each layer of cans is released at a predetermined correct level within the basket or container concerned. That is to say, each operation of the pick-up element on loading will terminate with the release of a layer of cans within the basket or container concerned at a height one layer's depth above the preceding layer. Similarly, each operation of the pick-up element on unloading will commence within the basket or container concerned at the correct level.

The actuating elements are preferably hydraulic or pneumatic piston and cylinder units which are controlled from a programme controller and from sensing micro switches within the apparatus.

The detaching means for the magnetic pick-up element is also actuated by hydraulic or pneumatic piston and cylinder units. The permanent magnet itself is preferably constituted by a ceramic permanent magnet which is clad with stainless steel; the cladding provides protection against mechanical damage to the magnet without affecting to any significant extent the magnetic properties of the magnet. The detaching means comprises a non-magnetic push plate which is supported over the face of the permanent magnet by means of the piston and cylinder units. The push plate is so arranged that when the magnet is in use it is interposed between the latter and cans attached thereto and actuation of the piston and cylinder units increases the separation between the cans and the magnet when release is desired.

Where the apparatus is for loading/unloading retort baskets, these latter are generally cylindrical in form and the magnetic pick-up element is in consequence of circular cross-section. In the preferred embodiment the forming means is constituted by a semi-circular barrier member which is arranged transversely of the assembly conveyor to receive cans propelled by the latter. The support means for the magnetic pick-up element is arranged to position the latter in register with the semi-circular barrier member when cans are to be picked up.

The assembly conveyor can be used to transfer cans unloaded from baskets or containers to the discharge conveyor. The latter is preferably constituted by a continuous belt of magnetised material which is arranged to form a terminal wall of assembly conveyor and to move transversely of the latter when the apparatus is in use. When cans are to be unloaded the barrier member is removed, the pick-up element unloads cans from the baskets or containers layer by layer and deposits them at a pick-up position on the assembly conveyor, i.e. it merely reverses the movements which it performs during loading. The assembly conveyor then transports the unloaded cans until the latter are brought into contact with the discharge conveyor which magnetically engages each transverse row of cans in turn so that the latter are removed from the apparatus, for example, to a further conveyor in a single row.

BRIEF DESCRIPTION OF DRAWINGS

The following description which is given merely by way of example of the invention relates to an apparatus for loading/unloading retort baskets in a cannery, the apparatus being shown in the accompanying drawing. In the drawings:-

DETAILED DESCRIPTION OF PREFERRED EMBODIMENT

The apparatus described is suitable for loading or unloading retort baskets, but it will be appreciated that it could be so constructed as to be suitable for either one of these operations only.

Figure 1:
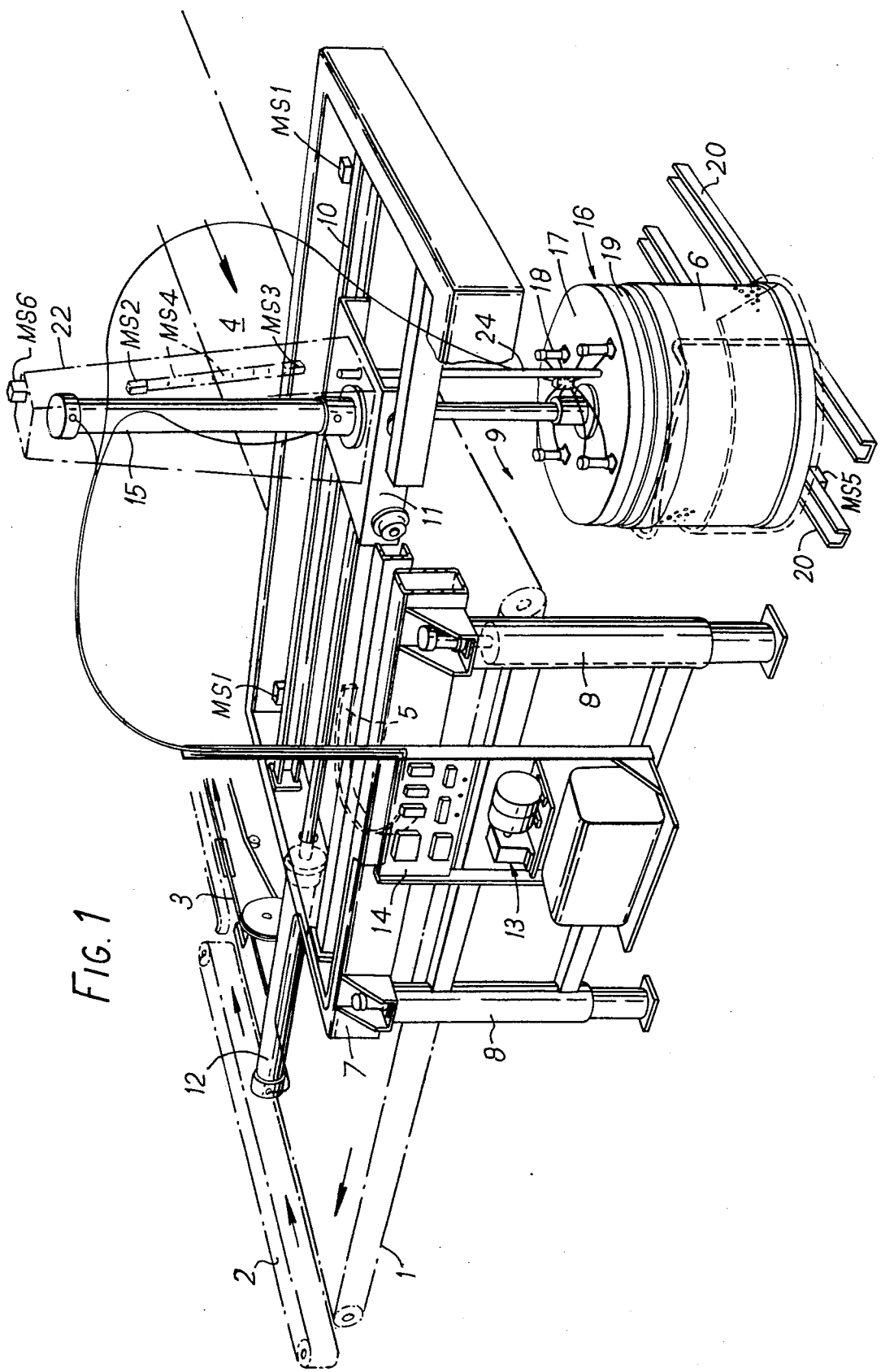
FIG. 1 is a general schematic view of the apparatus.

The apparatus as shown in FIG. 1 comprises a conveyor device comprising an assembly conveyor 1 of chain belt form, and having a horizontal run, a magnetised discharge conveyor 2 of magnetic material which provides a transverse terminal wall of the conveyor 1, an off-take conveyor 3 which is adapted to take a single row of cans, and a feed conveyor 4 which is adapted to feed cans transversely on to the assembly conveyor 1 from a filling and sealing machine (not shown). The directions of the movements of the conveyors 1, 2, 3 and 4 are indicated by appropriate arrows in the drawings and their operation can readily be determined from the letter.

An assembly means comprising a semi-circular barrier member 5 is removably positioned transversely of the assembly conveyor 1 and it will be appreciated that when the apparatus is in use with the barrier member 5 in position cans are fed transversely onto the assembly conveyor 1 by means of the feed conveyor 4, and are thereupon transported to and positioned in the barrier member 5 so as to be pre-positioned into a substantially circular form which corresponds with the horizontal cross-section of a retort basket 6 which is positioned at a loading/unloading station 9.

The frame 7 of the apparatus is supported in a vertically adjustable fashion by means of support members 8 above the assembly conveyor 1 and the retort basket 6 which is shown at the loading/unloading station 9. The frame 7 supports a track 10 in which is mounted a wheeled carriage 11. The wheeled carriage 11 is movable horizontally along the line of the run of the conveyor 1 by means of a hydraulic piston and cylinder unit 12 driven from a hydraulic pump unit 13 under the control of a programme card control unit 14. The carriage 11 supports a further piston and cylinder unit 15 which is arranged on a vertical axis and adjustably supports a permanent magnet pick-up element indicated generally at 16.

The permanent magnetic pick-up element 16 comprises a ceramic circular permanent magnet (not shown) which is housed within a stainless steel casing 17. Four piston cylinder units 18 are mounted on the upper face of the casing 17 and their piston rods are arranged to extend through the permanent magnet assembly to support a circular stainless steel push plate 19. The piston cylinder units 18 are controlled by a valve operated by a signal from the control centre 14 and are driven from the hydraulic pump unit 13 so that, when desired, the push plate 19 can forcibly separate cans attracted to the under-side of the pick-up element 16 from the magnet assembly 17. This has the effect of releasing the cans from the pick-up element 16.

The position of the carriage 11 is sensed by micro switches MS1 which are arranged on the guideway 10 so as to give an appropriate signal whenever the carriage 11 is in either of its extreme positions, i.e. whenever the magnetic pick-up element 16 is in position over the loading/unloading station 9 or at the pick-up position defined by the barrier 5. Height-sensing micro switches MS2, MS3, are arranged in a casing 22 (chain lines) surrounding the piston and cylinder unit 15 to be actuated by a striker 24 travelling with the pick-up element 16 to give signals whenever the magnetic pick-up assembly is at the top or bottom of its travel. Similar switches MS4 are provided at a number of intermediate adjustable positions separated in one layer increments (the adjustment of the positions depending on the height of the cans being loaded or unloaded) from the lowermost position of the pick-up element 16. The height-sensing micro switches are rendered sequentially effective in a loading/unloading operation by means of a uniselector of the control centre 14. Further micro switches MS5 are arranged beneath a conveyor 20 which transports the retort baskets into the loading/unloading station 9; these micro switches serve to prevent initiation of a loading/unloading operation unless a retort basket is correctly positioned at the loading/unloading station. Other micro switches (not shown) beneath the assembly conveyor 1 serve to ensure that a complete or substantially complete layer of cans has been built up in the barrier member 5 before a loading operation can commence.

Thus, in operation of the apparatus for loading a retort basket 6, the magnetic pick-up element 16 is moved to the assembly station defined by the barrier member 5, is lowered to pick up a layer of cans assembled in said barrier member, is raised, is transversed by operation of the piston/cylinder unit 12 to above the loading/unloading station; is lowered by an appropriate distance determined by the particular height sensing micro switch which has been rendered effective by the uniselector and is released of its layer of cans by extension of the piston an oblique stoke cylinder units 18. This cycle is repeated until the uppermost level-sensing micro switch MS2 is actuated as the last layer of cans is placed in the retort basket. The magnet is then raised to its uppermost position, arrival at which is detected by the striker 24 operating a microswitch MS6. The conveyor 20 is then operated to remove the loaded retort basket and to bring an empty retort basket into the loading/unloading station.

When retort baskets are to be unloaded the conveyor 4 is rendered ineffective and the barrier member 5 is removed. The pick-up element 16 is now caused to pick-up each layer of cans from a retort basket 6 and to release them on to the assembly conveyor 1 so that they are carried into contact with the magnetic discharge conveyor 2 and discharged from the apparatus in a single line along the conveyor 3 which feeds them to a labelling machine (not shown). The above operations are automatically performed under the control of the control centre 14 and it will be appreciated that various safety interlock arrangements which have not been described will be provided to ensure that the operation proceeds in the correct manner.

Figure 2:
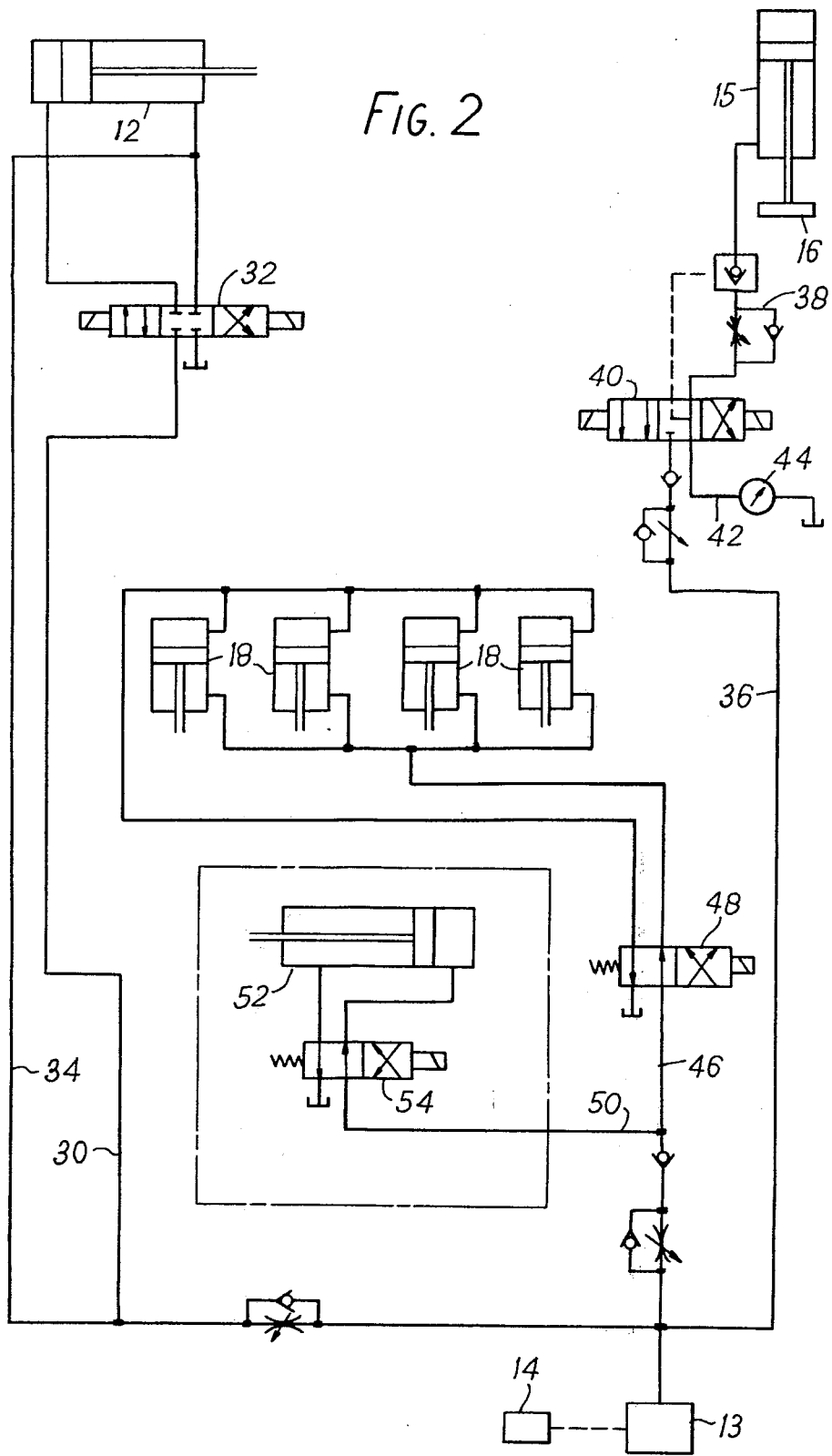
FIG. 2 is a diagrammatic representation of a hydraulic control circuit for the apparatus of FIG. 1.

FIG. 2 shows by way of further information, various valves and piston cylinder units of the apparatus of FIG. 1. It will be understood that the function of the control centre 14 includes the regulation of the operation in terms of adjustment for various can heights and whether the operation is one of loading or unloading Hydraulic fluid is supplied to piston and cylinder unit 12 through a line 30 under the control of a double acting solenoid valve 32. A boost line 34 supplies additional fluid pressure to the right hand chamber of the cylinder of unit 12.

The hydraulic pump unit 13 also provides fluid under pressure through line 36 to the lower chamber of piston and cylinder unit 15 when the magnet pick-up element 16 is to be raised. The element is arranged to be returned under gravity the return being controlled by a restrictor valve 38. Operation of the unit 15 is regulated by the position of a double-acting solenoid valve 40 which in one position provides a pilot line to a check valve 41 to hold it open as required. The exhaust line 42 from the cylinder of the unit 15 is provided with a flow register 44 which detects the cessation of movement of the magnet pick-up element downwards under gravity by setting up a signal when magnet meets resistance.

The four piston and cylinder unis 18 which control the push-plate 19 are operated in unison by fluid pressure in line 46 under the control of a spring-return solenoid valve 48.

A branch line 50 also provides fluid pressure to operate a piston and cylinder unit 52 when the barrier 5 is required to be moved between its operating position (loading cans into the baskets) and an inoperative position (when unloading). Movement is controlled by a spring return solenoid valve 54. Where the apparatus is not required for use in an unloading operation the portion of the circuit enclosed in chaindotted lines in FIG. 2 may be dispensed with.

It will be appreciated that the sequence of operation of the above mentioned solenoid valves is regulated by the control centre 14. The timing of the various stages is regulated by the signals from the various microswitches.

It will be appreciated that the lay-out of the apparatus will be governed by the factory arrangements and may be modified to accommodate can delivery from the left or from the right.

We claim:

1. An article-handling and transfer apparatus operable between a pick-up station located at one elevation and a receiving station located at a lower elevation, said apparatus comprising
    a transfer mechanism movable between the pickup and receiving stations to engage and transfer a group of articles, which are accumulated in a generally circular array at said pick-up station, to said receiving station while arranged in said generally circular array;
    means for vertically moving said transfer mechanism;
    a container at said receiving station;
    said container being of circular form to receive a group of said articles arranged in said generally circular array and being of sufficient depth to hold a plurality of layers of said grouped articles; and
    control means sequentially operable during vertical movement of said transfer mechanism for successively arresting movement of said transfer mechanism at pre-set appropriate levels in said container to create the plurality of layers of grouped articles, said control means incorporating
    switches arranged at heights adjustable to correspond with the depth of each layer and connected to produce the successive arrests of the transfer member as the number of layers of grouped articles increases;
    the controlled successive arrests of said transfer mechanism serving to prevent damage, such as bending in the case of cans, to the articles.

2. The apparatus according to claim 1 wherein said control means is operative to locate said transfer mechanism at an inoperative position which is at an elevation above said one elevation after the last layer of articles has been deposited in said container.

3. The apparatus according to claim 1 wherein said means for vertically moving said transfer mechanism comprises a single-acting, fluid linear actuator, a line supplying the actuator and a control device in communication with the line supplying the actuator, said control device being operable, in response to a value of pressure in said line, to indicate when a group of articles has been deposited and is supported within said container.

* * * * *